July 20, 1965   R. B. OLSAVSKY   3,195,571
MULTIPLE SPOOL VALVE ASSEMBLY
Original Filed Sept. 6, 1956

INVENTOR.
ROBERT B. OLSAVSKY
BY
Oberlin, Maky & Donnelly
ATTORNEYS

United States Patent Office 3,195,571
Patented July 20, 1965

3,195,571
MULTIPLE SPOOL VALVE ASSEMBLY
Robert B. Olsavsky, Akron, Ohio, assignor to Parker-Hannifin Corporation, Cleveland, Ohio, a corporation of Ohio
Original application Sept. 6, 1956, Ser. No. 608,303. Divided and this application Sept. 18, 1961, Ser. No. 138,963
9 Claims. (Cl. 137—596.12)

This application is a division of application, Serial Number 608,303, filed September 6, 1956, and now abandoned.

The present invention relates as indicated to a multiple spool valve assembly adapted for installation in a fluid pressure system for controlling the operation of a corresponding number of fluid motors.

It is an object of this invention to provide a spool valve assembly which embodies a novel form of carry-over port and fitting by which one spool valve assembly may be connected to another for selective operation of the respective fluid motors that are connected with the cylinder ports of said assemblies.

It is another object of this invention to provide a spool valve assembly with plural spools arranged for selective actuation of the associated fluid motors and for concurrent actuation of said fluid motors by conducting the discharge from an upstream motor to a downstream motor.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
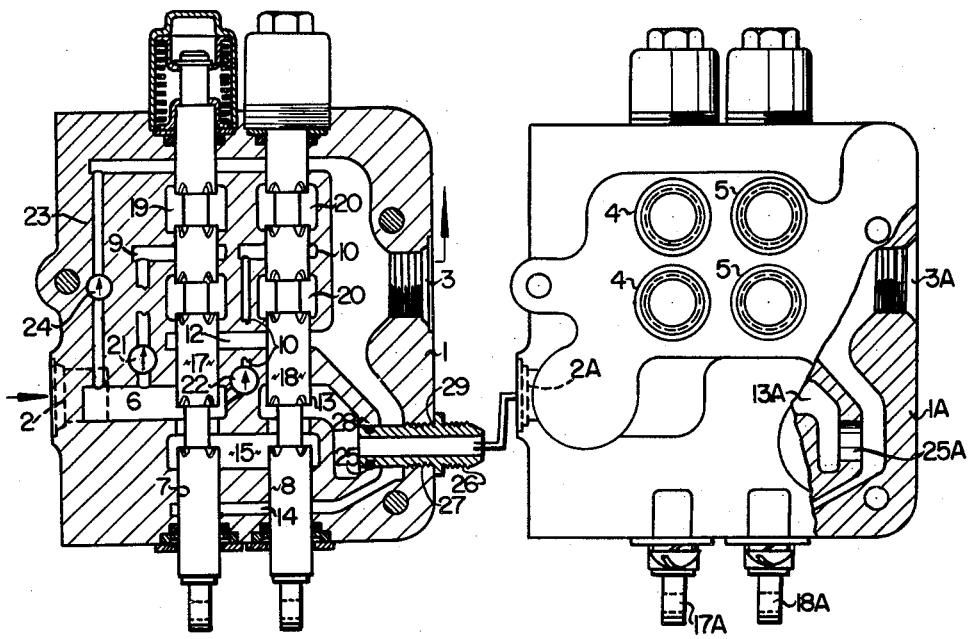
Figure 2:
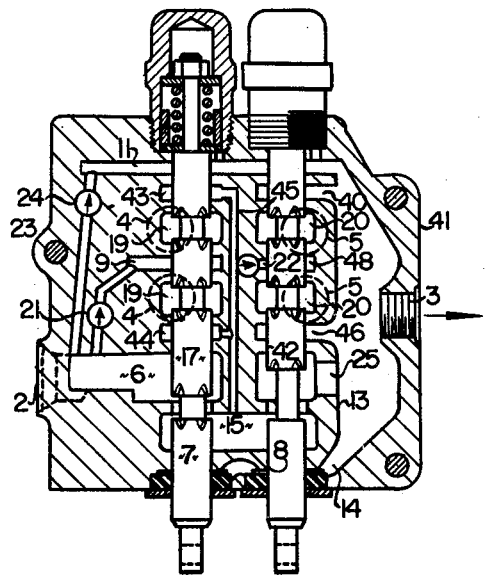

In said annexed drawings:

FIG. 1 shows two spool valve assemblies connected together by means of a carry-over fitting according to the present invention, one assembly being shown in cross-section through the axes of the spools therein, and the other assembly being shown partly in section; and FIG. 2 shows another multiple spool valve assembly which may be substituted for either assembly in FIG. 1.

Referring first to the embodiment of the invention illustrated in FIG. 1, the control valve assembly at the left comprises a unitary cast housing 1 formed with a pressure inlet port 2, an outlet or tank port 3, and two pairs of service ports 4—4 and 5—5 (see right assembly FIG. 1), respectively adapted for connection with the discharge port of a hydraulic pump (not shown), with a tank or fluid reservoir (not shown), and with the ports of a pair of double acting hydraulic cylinders or the like (not shown). The inlet port 2 communicates with a cored passage network in said housing 1 including a main trunk 6 that intersects the bore 7 of the two parallel bores 7 and 8, and branches 9 and 10 which respectively intersect the bores 7 and 8 at regions axially removed from the trunk 6.

The tank port 3 communicates with a cored passage network including branches 11, 12, 13, and 14 of which the branches 11, 12 and 14 intersect both bores 7 and 8 at axially spaced apart regions, as shown, and of which the branch 13 intersects only bore 8 and is preferably generally aligned with trunk 6. A connecting passage 15 intersects bores 7 and 8 to provide a bypass which communicates the trunk 6 with the tank port branch 13 when both of the four-way spools 17 and 18 in the respective bores 7 and 8 are in neutral position as shown in FIG. 1.

The service ports 4—4 communicate with cored passages 19—19 which intersect the bore 7 at regions straddling the inlet branch 9; and the service ports 5—5 communicate with cored passages 20—20 which intersect bore 8 at regions straddling the inlet branch 10.

The four-way spools 17 and 18 are slidably fitted in the respective bores 7 and 8, are each spring-centered in neutral position, and are formed with four lands and three intervening grooves, the lands having V-shaped grooves effective in well-known manner to provide for the metering of the flow of fluid therepast.

Interposed in the respective inlet branches 9 and 10 which are disposed upstream of the respective bores 7 and 8 are spring-actuated check valves 21 and 22 and in another branch passage 23 that intersects trunk 6 and leads to the tank port branch 11 there is installed an adjustable sprind-loaded relief valve 24.

When the spools 17 and 18 are in neutral position as shown in FIG. 1, the flow of fluid from the inlet branches 9 and 10 to the service ports 4—4 and 5—5 is blocked while fluid freely flows from trunk 6 through bypass 15 and through the hereinafter described carry-over fitting through corresponding passages in the downstream control valve assembly 1A which has a branch 13A leading to tank port 3A via a circular passage 25A.

When one or both spools 17 and 18 are axially shifted in either direction from neutral position, the bypass of fluid from trunk 6 is automatically blocked by the shifted spool or spools whereby flluid under pressure is conducted to one of the service ports 4—4 and/or 5—5 by way of the associated branches 9 and 19 and/or 10 and 20 while fluid from the respective motors is displaced through the other service port 4 and/or 5 and the tank branch 11 or 12 to the tank port 3.

When both spools 17 and 18 are shifted to an operating position as aforesaid, the check valves 21 and 22 are operative to prevent back flow of fluid from, for example, a highly loaded fluid motor to a less highly loaded fluid motor irrespective of which pairs of service ports 4—4 and 5—5 are connected to the highly loaded motor.

A characterizing feature of housing 1 is that the bore 25 in the tank port branch passage 13 is a convenient point of connection for the carry-over fitting 26 when the housing 1 is drilled and tapped as at 27, said fitting 26 communicating the inlet port 2 of housing 1 with the inlet port 2A of a second similar valve housing 1A. The joints between bore 25 and threaded opening 27 and the fitting 26 are sealed as by packing rings 28 and 29 so that fluid under pressure may pass through the first valve assembly shown at the left in FIG. 1, to the inlet port 2A of a second valve assembly 1A. Of course, if the spools 17A and 18A are also in neutral position, the fluid will be by-passed to the tank port 3A of said second valve assembly 1A via branch 13A and opening 25A.

Although in the FIG. 1 embodiment of the invention both spools 17 and 18 and 17A and 18A are shown as being of the four-way or double acting type, it is to be understood that the well-known three-way or single acting type spools may be substituted for any one, two, three or four of the spools 17, 18, 17A, and 18A.

Referring now to the embodiment of the invention illustrated in FIG. 2, the same comprises a housing 41 which is generally similar to housing 1 except that the coring has been modified for series operation of two fluid motors. In this case a three-way spool 42 in bore 8 has replaced the four-way spool 18 and the upper service port 5 may be plugged. The four-way spool 17, the inlet port 2, the trunk 6, the branch 9 with check valve 21 therein and the branch 23 with relief valve 24 therein, may be identical with parts in the FIG. 1 embodiment and therefore the same reference characters have been employed.

As aforesaid, the housing 1 and 41 differ in the cored passages therein, the latter having a tank port 3 with branches 11 and 14 adjacent the ends of spools 17 and 42 so as to expose the packings thereat only to the relatively low tank pressure. The housing 41, like housing 1, is formed with a connecting or bypass passage 15 between the bores 7 and 8 and adjacent to the tank branch 13 which leads to tank port 3 by way of opening 25 or leads to the inlet port 2A of a succeeding valve assembly 1A when a carry-over fitting 26 is installed in opening 25. However, in place of the common tank port branch 12 in housing 1, the housing 41 has separate tank branches 43 and 44 intersecting bore 7 which are common to bypass 15 by way of the cored passage 45. Said housing 41 has two separate tank branches 46 intersecting bore 8 and straddling the passages 20—20 that communicate with the service ports 5—5.

The other check valve 22 is disposed between supply passage 48 to bore 8 and the aforesaid passage 45.

As can now be seen, when the spools 17 and 42 are in neutral position, fluid under pressure in inlet port 2 and branch 9 is blocked by spool 17 from flowing through either of the passages 19—19 to the doube acting cylinder (not shown) which is adapted to be connected with the service ports 4—4, and consequently, the fluid flows through trunk 6 to bypass 15, and thence past the spool 42 and through branch 13 and opening 25 to the tank port 3 or through the carry-over fitting 26 for flow through the bypass circuit of a succeeding valve assembly 1A, as shown in FIG. 1.

When the four-way spool 17 is shifted to either side of the neutral position, the bypass 15 will be blocked thereby so that fluid under presure will flow from trunk 6 through branch 9 and check valve 21 through one passage 19 to one service port 4, and the fluid displaced or discharged by the double acting fluid motor flows to the tank port 3 via the other service port 4, the other passage 19, the adjacent tank branch 43 or 44, as the case may be, the passage 45, the bypass 15, and the tank branch 13, or the carry-over fitting 26, as the case may be.

When the three-way spool 42 is shifted axially upward, (with spool 17 in neutral position) the bypass of fluid through passages 15 and 13 is blocked by spool 42 whereby fluid under pressures passes from trunk 6 and through bypass 15, passage 45, passage 48 and the check valve 22 therein, and the lower passage 20 to the lower unblocked service port 5 to actuate a single acting fluid motor connected to said lower service port 5. Now, when the spool 42 is shifted axially downward past the neutral position, fluid may be drained from said single acting motor through said lower service port 5, the lower passage 20, and the adjacent tank branch 46 to the tank port 3. In this position of the spool 42, the bypass 15 is open to the branch 13.

Now, if both spools 17 and 42 are actuated, the bypass 15 will be closed by both spools, whereby fluid is displaced by the double acting motor through one service port 4 and one passage 43, or 44, to bypass 15 via passage 45. Because communication of the bypass 15 with the branch 13 is then blocked, pressure builds up in passage 45, whereby fluid flows through the supply passage 48 and check valve 22 therein to actuate the single acting fluid motor as already explained. This is series operation wherein a downstream motor is actuated by the fluid discharged from an upstream motor.

In this way, the FIG. 2 embodiment makes provision for indepedent operation of plural fluid motors and for simultaneous operation of said motors, whereby in the particular example given, a double acting motor may be actuated in either direction while a single acting fluid motor is actuated by the fluid discharged or displaced by the double acting motor, said discharged fluid flowing into the single acting motor instead of into the tank or reservoir. Of course, series operation of a downstream double acting motor may be effected by substitution of a four-way spool 18 for the three-way spool 42 and unplugging the service port 5 which was plugged for three-way operation.

In all of the embodiments of the invention herein the bore 25 provides a convenient connection point for carry-over of one valve assembly 1 to another valve assembly 1A through the special carry-over fitting. Also, as aforesaid, the bore 25 in the housing 41 of FIG. 2 may be provided with the carry-over fitting 26 for connection of the assembly 41 with an assembly 1A, or with another assembly 41.

Other modes of applying the principle of the invention may be employed, change being made as regards the details described, provided the features stated in any of the following claims, or the equivalent of such, be employed.

I therefore particularly point out and distinctly claim as by invention:

1. In combination, successive spool valve assemblies each comprising a housing having inlet and outlet ports, a motor port, a bypass, and at least one spool bore intersected axially therealong by said ports and bypass; one housing having a tubular carry-over fitting secured therein effective to block fluid communication between the bypass and the outlet port thereof and to establish fluid communication between the bypass thereof and the inlet port of a succeeding housing; the bypass of said succeeding housing having fluid communication with the outlet port thereof; a spool movable in each spool bore from a neutral position blocking fluid communication between said inlet and motor ports and permitting flow of fluid from the inlet port of said one housing to the outlet port of said succeeding housing via said bypass and fitting of said one housing and said inlet port and bypass of said succeeding housing to an operating position blocking said bypass and permitting flow of fluid from said inlet port to said motor port.

2. The combination of claim 1 wherein said one housing has coaxial openings with which said fitting has sealed engagement.

3. The combination of claim 1 wherein said succeeding housing has a circular opening for flow of fluid from said bypass to said outlet port.

4. The combination of claim 1 wherein each housing has a circular opening between said bypass and said outlet port, wherein said one housing has a second opening through the exterior wall thereof coaxial with said circular opening, and wherein said fitting has sealed engagement with both openings of said one housing.

5. A spool valve assembly comprising a housing having inlet and outlet ports, motor ports connectible with fluid motors, a bypass from said inlet port to said outlet port, and plural spool bores each intersected axially therealong by said ports and bypass; spools selectively movable in the respective bores from neutral position whereat said motor ports are blocked thereby and said inlet and outlet ports are in fluid communication via said bypass to operating position whereat said bypass is blocked thereby and said inlet and motor ports are in fluid communication for actuation of the respective fluid motors; said inlet port for one spool bore which is downstream from another spool bore comprising a passage leading to said one spool bore from a portion of said bypass between said spool bores and form an outlet port of said another spool bore whereby, upon simultaneous movement of said spools to operating position, fluid under pressure is supplied to said one spool bore via the outlet port of said another spool bore; said housing having coaxial openings leading to said bypass and a cross-over fitting secured in said openings; and another housing having inlet and outlet ports, a motor port connectible with a fluid motor, and a spool bore intersected axially therealong by said ports and bypass; and a spool movable in the spool bore of said another housing between neutral and operating positions as aforesaid; the inlet port of said another housing being in fluid communication with the bypass of the first-mentioned housing via said fitting.

6. In combination, successive multiple spool valve assemblies each comprising a housing having inlet, outlet, and motor ports, a bypass, and at least two spool bores intersected axially therealong by said ports and bypass; one housing having a tubular carry-over fitting secured therein effective to block fluid communication between the bypass and the outlet port thereof and to establish fluid communication between the bypass thereof and the inlet port of a succeeding housing; the bypass of said succeeding housing having fluid communication with the outlet port thereof; a spool movable in each spool bore of said one and succeeding housings from a neutral position blocking fluid communication between said inlet and motor ports and permitting flow of fluid from the inlet port of said one housing to the outlet port of said succeeding housing via said bypass and fitting of said one housing and said inlet port and bypass of said succeeding housing to an operating position blocking said bypass and permitting flow of fluid from said inlet port to said motor port.

7. The combination of claim 6 wherein the inlet port of said one housing intersects the spool bores thereof thus to enable both spools to be in operating position at the same time.

8. The combination of claim 6 wherein one of said one and succeeding housings has an inlet port comprising a first passage intersecting one spool bore thereof and a second passage intersecting the outlet port of said one spool bore, the other spool bore, and a portion of the bypass between said spool bores whereby, when both spools are in operating position at the same time, fluid under pressure is supplied to the inlet port of said one spool bore via said first passage, and to the inlet port of said other spool bore via the outlet port of said one spool bore and said second passage.

9. The combination of claim 8 wherein said first and second pasasges each have a check valve therein to permit flow of fluid in one direction only from said first passage into said one spool bore and from said second passage into said other spool bore when both spools are in operating position.

References Cited by the Examiner

UNITED STATES PATENTS

| | | | |
|---|---|---|---|
| 2,651,324 | 9/53 | Hodgson et al. | 137—596.12 |
| 2,745,433 | 5/56 | Schneider et al. | 121—46.5 X |
| 2,783,745 | 3/57 | Stephens | 121—46.5 |
| 2,856,960 | 10/58 | Stacey | 121—46.5 X |
| 2,873,762 | 2/59 | Tennis | 121—46.5 X |
| 2,954,052 | 9/60 | Kiehbiel | 121—46.5 X |
| 3,052,218 | 9/62 | Tennis | 121—46.5 |

FOREIGN PATENTS 1,031,595    6/58    Germany.

M. CARY NELSON, *Primary Examiner.*

KARL J. ALBRECHT, *Examiner.*